United States Patent
Higuti et al.

[11] Patent Number: 6,011,455
[45] Date of Patent: Jan. 4, 2000

[54] WALL SURFACE ABSORPTION TYPE MOVING DEVICE AND MAGNET DRIVING METHOD OF THE WALL SURFACE ABSORPTION TYPE MOVING DEVICE

[75] Inventors: Masaru Higuti; Tomoyosi Ibe, both of Hyogo-ken, Japan

[73] Assignee: Mitsubishi Heavy Industries, Ltd., Tokyo, Japan

[21] Appl. No.: 09/101,757
[22] PCT Filed: Nov. 19, 1997
[86] PCT No.: PCT/JP97/04210
  § 371 Date: Jul. 17, 1998
  § 102(e) Date: Jul. 17, 1998
[87] PCT Pub. No.: WO98/22330
  PCT Pub. Date: May 28, 1998

[30]     Foreign Application Priority Data

Nov. 19, 1996  [JP]  Japan ................................. 8-308537

[51] Int. Cl.⁷ ...................................................... H01F 7/08
[52] U.S. Cl. ......................... 335/223; 180/9.52; 180/119
[58] Field of Search ................................ 335/220, 223–9, 335/240; 180/9.52, 119, 116–8, 901; 305/3, 6, 36; 105/78

[56]         References Cited

U.S. PATENT DOCUMENTS 4,828,059  5/1989  Naito et al. ............................. 118/119

5,220,869  6/1993  Pelrine et al. ............................. 105/78

Primary Examiner—Lincoln Donovan
Attorney, Agent, or Firm—Armstrong, Westerman, Hattori, McLeland & Naughton

[57]         ABSTRACT

A wall surface attraction type moving apparatus travels on a magnetic wall surface of a large iron structure for maintenance, inspection and other purposes. The apparatus includes a moving body movable on the wall surface, front and rear wheels, permanent magnets, drive mechanisms each for moving the respective permanent magnet toward and away from the wall surface, permanent magnet position sensors, permanent magnet attraction force sensors, and obstacle sensors. If one obstacle sensor detects an obstacle appearing in the travelling path of the moving body, the corresponding drive mechanism is controlled to retract the permanent magnet which is likely to bump against the obstacle away from the wall surface while the other drive mechanisms advance the other permanent magnets which are unlikely to bump against the obstacle toward the wall surface so that the attraction force of the advanced permanent magnets are increased to supplement the reduced attraction force of the retracted permanent magnet. With this arrangement, the optimal attraction force for smooth and uninterrupted travelling of the moving body can be realized.

9 Claims, 8 Drawing Sheets

F I G. 6
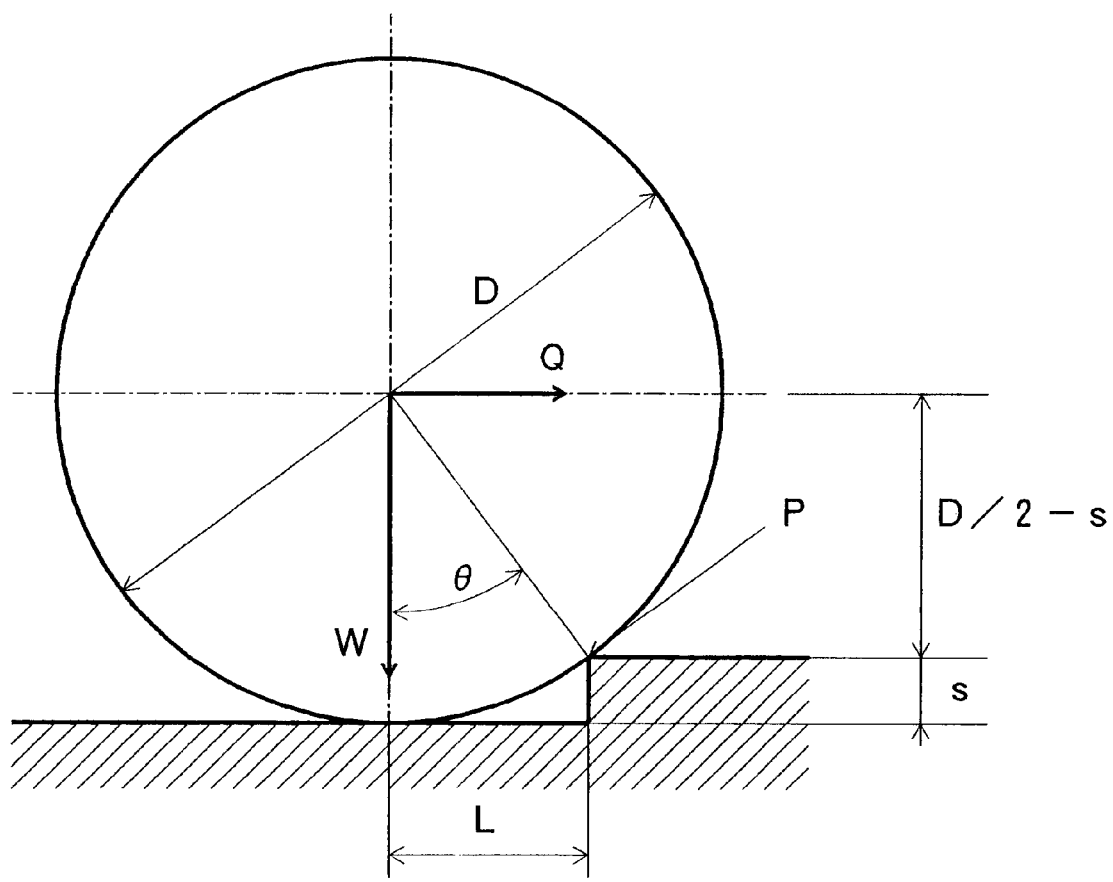

ATTRACTION FORCE

WALL SURFACE ABSORPTION TYPE MOVING DEVICE AND MAGNET DRIVING METHOD OF THE WALL SURFACE ABSORPTION TYPE MOVING DEVICE

TECHNICAL FIELD

The present invention relates to a wall surface attraction type moving apparatus applicable to the maintenance/inspection, etc. of a large iron structure, and particularly relates to a wall surface attraction type moving apparatus and a magnet drive method for a wall surface attraction type moving apparatus which perform attraction to a wall surface during movement by applying the magnetic force of a permanent magnet to the wall surface made of a magnetic substance.

BACKGROUND ART

For a structure formed with a magnetic substance such as a large iron structure, attraction to the structure can be performed by magnetic force. Therefore, for the maintenance/inspection of a structure such as this, etc., there has been developed a wall surface attraction type moving apparatus which can make a moving body attract to a structure by taking advantage of magnetic force. In such a wall surface attraction type moving apparatus, since a moving body is caused to be attracted to a structure by magnetic force, the travel of a moving body can also be performed even if the surface of a structure on which the moving body travels is not vertically present downward, i.e., even against a vertical surface.

For instance, FIG. 7 is a schematic constitution diagram showing a conventional wall surface attraction type moving apparatus, and as shown in FIG. 7, the moving apparatus is constituted by a moving body (moving carriage) 110 travelable along the surface of a structure, and travel wheels 112 and 113, a magnetic force type attraction mechanism 130, and a manipulator 120 for operations such as maintenance/inspection, respectively installed in this moving carriage 110.

Particularly, the attraction mechanism 130 is provided with an advancing/retreating rod 132 projected from the lower surface of the moving carriage 110, a permanent magnet (hereinafter referred to as a magnet) 134 installed on the point end of this advancing/retreating rod 132, and a drive mechanism 131 or driving the magnet 134 to leave or approach a magnetic travel surface (magnetic wall surface) 102 under the moving carriage 110 by advancing or retreating the advancing/retreating rod 132.

And in order to adjust the distance between the magnet 134 and the travel surface 102 and adjust the magnetic force (i.e., attraction force) of the magnet 134 by controlling the drive mechanism 131, a force sensor 133 and a controller (attraction force control section) 135 are provided. The force sensor 133 is installed in the proximity of the magnet 134 and detects the strength of magnetic force which acts between the magnet 134 and the travel surface 102. The attraction force control section 135 receives a detection signal corresponding to the magnetic force (i.e., attraction force) between the magnet 134 and the travel surface 102 from this force sensor 133. This detection signal controls the drive mechanism 131 with feedback control based on the detection signal so that this magnetic force (attraction force) becomes a predetermined value, thereby adjusting the advancement/retreat quantity of the advancing/retreating rod 132 and adjusting the distance between the magnet 134 and the travel surface 102.

In other words, the magnetic force (attraction force) acting between the magnet 134 and the travel surface 102 varies in correspondence to the distance between the magnet 134 and the travel surface 102. Therefore, in order for a predetermined magnetic force to act between the magnet 134 and the travel surface 102, the distance between the magnet 134 and the travel surface 102 needs to be controlled in correspondence to this predetermined magnetic force. The attraction force control section 135 controls the distance between the magnet 134 and the travel surface 102 through the drive mechanism 131 so that the magnetic force acting between the magnet 134 and the travel surface 102 becomes a predetermined magnitude, while the detection signal of the force sensor 133 is being fed back.

With such control by the attraction force control section 135, for example even if the travel surface 102 has irregularities thereon and is in a state like an uneven ground, the position of the magnet 134 will be adjusted in correspondence to this travel surface 102 and therefore the attraction force by the magnet 134 can be held nearly constant at all times. In other words, with such control, the gap between the magnet 134 and the travel surface 102 to which this magnet 134 is opposed becomes constant at all times and the required attraction force is stably exhibited, whereby attraction of the moving carriage 110 to the travel surface 102 is performed with reliability.

Incidentally, in the case where a wall surface attraction type moving apparatus such as the above-mentioned rides across an obstacle on the travel surface 102 such, for example, as a projection 102A shown in FIG. 8 or level difference 102B shown in FIG. 109, there is a need to adjust the advancement/retreat quantity of the advancing/retreating rod 132 so that the magnet 134 is not interfered with by the obstacle.

However, as shown in FIGS. 8 and 9, in the case where the apparatus rides across the projection 102A, level difference 102B, or the like, the magnet 134 must be moved away from the opposite travel surface 102 in correspondence to the height of the projection 102A, level difference 102B, or the like. If done in this manner, the magnet force acting between the magnet 134 and the travel surface 102 will be considerably reduced and therefore it will be difficult to ensure attraction force necessary to cause the moving carriage 110 to be attracted to the travel surface 102 with reliability. Of course, if the magnet 134 is made powerful, attraction force can be increased, but this is undesirable because, in order to ensure necessary attraction force, an extremely large magnet 134 is needed, a considerable increase in the weight or size of the moving apparatus is incurred, an increase in the capacity of a drive unit such as a motor associated with travel drive is required, and so on.

SUMMARY OF THE INVENTION

The present invention has been made in view of the above-mentioned problems, and an object of the invention is to provide a wall surface attraction type moving apparatus and a magnet drive method for a wall surface attraction type moving apparatus which can make the apparatus be attracted to a travel surface with reliability so that a permanent magnet is not interfered with by an obstacle when riding across an obstacle on a wall surface (travel surface), while suppressing an increase in the weight and size of the apparatus.

To this end, in a wall surface attraction type moving apparatus provided with a moving body which moves on a wall surface made of a magnetic substance, an attraction mechanism provided in the moving body, and a controller for controlling the attraction mechanism, the wall surface attraction type moving apparatus of the present invention is characterized in that: said attraction mechanism is provided with a permanent magnet installed in the moving body, a drive mechanism for advancing or retreating the permanent magnet in a direction which leaves or approaches the wall surface, and an attraction force sensor for detecting an attraction force of the permanent magnet to the wall surface; said attraction mechanism is provided with a plurality of sets of attraction mechanisms; and said controller controls the drive mechanisms in the attraction mechanisms on the basis of detection information from said attraction force sensors so that the required wall surface attraction force which can hold the moving body on the wall surface is generated by the sum total of wall surface attraction forces of the permanent magnets in the attraction mechanisms.

By constitution such as this, with the magnetic force acting between the permanent magnets respectively provided in a plurality of attraction mechanisms and the wall surface made of a magnetic substance as wall surface attraction force, the moving body moves on the wall surface while being attracted to the wall surface. At this time, the attraction forces of the magnets to the wall surface are detected by the attraction force sensors. The controller controls the drive mechanisms of the attraction mechanisms on the basis of detection information from the attraction force sensors so that the sum total of the wall surface attraction forces of the permanent magnets becomes the required wall surface attraction force which can hold the moving body on the wall surface.

Thus, the required wall surface attraction force is always ensured as a whole by cooperation of a plurality of attraction mechanisms. Therefore, even in the case where there is a possibility that the permanent magnet in any of the attraction mechanisms will be interfered with by the obstacle, the drive mechanism of this attraction mechanism is controlled so that the interference between the permanent magnet and the obstacle is avoided, whereby the required wall surface attraction force can always be ensured as a whole through the other attraction mechanisms. This makes it possible to move the moving body on the wall surface without hindrance while holding it onto the wall surface reliably.

In addition, since the sum total of the wall surface attraction forces of the permanent magnets is controlled so as to become the required wall surface attraction force, an excessive increase in the wall surface attraction force can also be avoided. For example, even in the case where the moving body rides across an obstacle such as level difference or a projection, the load associated with movement is reduced and there is also an effect that the moving function is enhanced.

Also, the above-mentioned attraction mechanism may be constituted by said permanent magnet, said drive mechanism, and said attraction force sensor, and also by a position sensor for detecting a leaving/approaching direction position of the permanent magnet against said wall surface, and an obstacle sensor for detecting an approach of an obstacle present on the wall surface to the permanent magnet. On the basis of detection information from said position sensors, attraction force sensors, and obstacle sensors, said controller may be constituted so as to control the drive mechanisms so that said required wall surface attraction force is generated by the sum total of wall surface attraction forces of the permanent magnets in the drive mechanisms, and so as to control the drive mechanism so that in the case where there is a possibility that the permanent magnet will be interfered with by the obstacle, this interference is avoided.

By constitution such as this, with the magnetic force acting between the permanent magnets respectively provided in a plurality of attraction mechanisms and the wall surface made of a magnetic substance as wall surface attraction force, the moving body moves on the wall surface while being attracted to the wall surface. At this time, the leaving/approaching direction position of the permanent magnet against the wall surface is detected by the position sensor, and the attraction force of the permanent magnet to the wall surface is detected by the attraction force sensor. The approach of the obstacle present on the wall surface to the permanent magnet is detected by the obstacle sensor. The controller controls the drive mechanisms of the attraction mechanisms on the basis of detection information from the position sensor, attraction force sensor, and obstacle sensor so that the sum total of the wall surface attraction forces of the permanent magnets becomes the required wall surface attraction force which can hold the moving body on the wall surface.

And in the case where there is a possibility that the permanent magnet in any of the attraction mechanisms will be interfered with by the obstacle, the drive mechanism of this attraction mechanism is controlled, thereby avoiding the interference between the permanent magnet and the obstacle. During this interference avoidance, although the attraction force of the permanent magnet of the attraction mechanism which becomes an object of control will usually be weakened because the permanent magnet is adjusted so as to be moved away from the wall surface, the drive mechanism of the other attraction mechanism is controlled so that the sum total of the attraction forces of the permanent magnets becomes the required wall surface attraction. Therefore, since the required surface wall attraction force is ensured as a whole, the moving body is held with reliability on the wall surface.

Therefore, the moving body can be held with reliability on the wall surface and moved on the wall surface, while the interference between the permanent magnet and the obstacle is being avoided with reliability.

In addition, by control such that the sum total of the wall surface attraction forces of the permanent magnets becomes the required wall surface attraction force, an excessive increase in the wall surface attraction force due to interference avoidance can also be avoided. Therefore, for example, even in the case where the moving body rides across an obstacle such as level difference or a projection, the load associated with movement is reduced and there is also an effect that the moving function is enhanced.

Furthermore, the permanent magnets of said attraction mechanisms may be disposed so that their positions are offset longitudinally in a moving direction of said moving body. On the basis of detection information from said obstacle sensors, with respect to one attraction mechanism of said plurality of attraction mechanisms which has the possibility of said permanent magnet being interfered with by said obstacle, said controller may perform retreat adjustment of the permanent magnet against the wall surface through said drive mechanism so that this interference is avoided, and at the same time, with respect to one attraction mechanism of said plurality of attraction mechanisms which has no possibility of the permanent magnet being interfered with by said obstacle, said controller may perform advancement adjustment of the permanent magnet against the wall surface through said drive mechanism so that said required wall surface attraction force is generated by the sum total of wall surface attraction forces of the permanent magnets in said drive mechanisms.

By constitution such as this, in the case where there is a possibility that the permanent magnet in any of the attraction mechanisms will be interfered with by the obstacle, retreat adjustment of the permanent magnet against the wall surface is performed through the drive mechanism controlled by the controller, thereby avoiding such interference. In this retreat-adjusted permanent magnet, the wall surface attraction force is reduced. However, at the same time as this interference avoidance control, the other attraction mechanism is present which has no possibility of the permanent magnet being interfered with by the above-mentioned obstacle, and with respect to this attraction mechanism, advancement adjustment of the permanent magnet against the wall surface is suitably performed and the sum total of the wall surface attraction forces of the permanent magnets in the drive mechanisms is controlled so as to reach the required wall surface attraction force, so the moving body is held with reliability on the wall surface.

This makes it possible to hold the moving body on the wall surface reliably and move it on the wall surface while the interference between the permanent magnet and the obstacle is being avoided with reliability. Of course, as described above, an excessive increase in the wall surface attraction force can also be avoided, and there is also an effect that the moving function is enhanced.

Furthermore, the above-mentioned obstacle sensors may be constituted so as to detect said obstacle present on the wall surface by detecting a distance between said wall surface and an object in a detection direction oriented onto said wall surface just under said moving body. Also the obstacle sensors may be provided with front obstacle sensors respectively installed directly before said permanent magnets in said moving direction. If any of said plurality of front obstacle sensors detects the presence of said obstacle, on the basis of a distance to the obstacle detected with the front obstacle sensor and said leaving/approaching direction position of a corresponding permanent magnet detected with said position sensor, said controller may control advancement or retreat adjustment of the permanent magnet through said drive mechanism.

By constitution such as this, it also becomes possible to perform the position adjustment of the permanent magnet against the obstacle in a short time and moreover efficiently.

Furthermore, in the case where any of said plurality of front obstacle sensors detects the presence of said obstacle and there is a possibility that the obstacle will be interfered with by a corresponding permanent magnet, said controller may perform retreat adjustment of the permanent magnet through said drive mechanism by a quantity that can avoid the interference.

By constitution such as this, an advantage of being able to perform the interference control of the obstacle of the permanent magnet in a short time and moreover efficiently and reliably is obtained.

In addition, it is preferable that the retreat adjustment quantity for avoiding the interference between said permanent magnet and the obstacle be set so that said leaving/approaching direction position of the permanent magnet detected with said position sensor becomes longer by a predetermined distance than a distance to said obstacle detected with said front obstacle sensor.

By constitution such as this, the interference control of the obstacle of the permanent magnet can be performed with reliability.

Furthermore, in the case where any of said plurality of front obstacle sensors detects the presence of said obstacle and the obstacle is a groove-shaped obstacle located away from a corresponding permanent magnet, said controller may be constituted so as to ensure said required wall surface attraction force by performing advancement adjustment of the permanent magnet through said drive-mechanism.

By constitution such as this, it also becomes possible to perform the position adjustment of the permanent magnet against the obstacle in a short time and moreover efficiently.

Furthermore, the above-mentioned obstacle sensors may be constituted so as to detect said obstacle present on the wall surface by detecting a distance between said wall surface and an object in a detection direction oriented onto said wall surface just under said moving body. Also, the obstacle sensors may be provided with rear obstacle sensors respectively installed directly after said permanent magnets in said moving direction. If any of said plurality of rear obstacle sensors detects the presence of said obstacle during a retreat of said moving body, on the basis of a distance to the obstacle detected with the rear obstacle sensor and said leaving/approaching direction position of a corresponding permanent magnet detected with said position sensor, said controller may be constituted so as to perform advancement or retreat adjustment of the permanent magnet through said drive mechanism.

By constitution such as this, even if there is present an obstacle on a flat surface during a retreat of the moving body, it will be possible to perform the position adjustment of the permanent magnet against the obstacle in a short time and moreover efficiently.

Also, in a magnet drive method for a wall surface attraction type moving apparatus which is provided with a moving body which moves on a wall surface made of a magnetic substance and an attraction mechanism provided in the moving body, in which said attraction mechanism is provided with a permanent magnet installed in said moving body and a drive mechanism for advancing or retreating the permanent magnet in a direction which leaves or approaches said wall surface and also provided with a position sensor for detecting a leaving/approaching direction position of the permanent magnet against the wall surface, an attraction force sensor for detecting an attraction force of the permanent magnet to the wall surface, and an obstacle sensor for detecting an approach of an obstacle present on the wall surface to the permanent magnet, and lastly in which said attraction mechanism is provided with a plurality of sets of attraction mechanisms, the magnet drive method for a wall surface attraction type moving apparatus of the present invention is characterized by comprising the steps of:

if an approach of said obstacle present on said wall surface to said permanent magnet is detected by any of said obstacle sensors;

setting an appropriate distance to the wall surface on this side of the obstacle of one permanent magnet of said permanent magnets which approaches the obstacle, in correspondence to a distance to said obstacle detected with the obstacle sensor;

controlling the drive mechanism of the permanent magnet which approaches said obstacle in correspondence to this set appropriate distance; and controlling the drive mechanism of the other permanent magnet of the permanent magnets so that said required wall surface attraction force is generated by the sum total of wall surface attraction forces of said permanent magnets.

By constitution such as this, in the case where there is a possibility that the permanent magnet in any of the attraction mechanisms will be interfered with by the obstacle, the drive mechanism of this attraction mechanism is controlled, thereby avoiding the interference between the permanent magnet and the obstacle. During this interference avoidance, although the attraction force of the permanent magnet of the attraction mechanism which becomes an object of control will usually be weakened because the permanent magnet is adjusted so as to be moved away from the wall surface, the drive mechanism of the other attraction mechanism is controlled so that the sum total of the attraction forces of the permanent magnets becomes the required wall surface attraction. Therefore, since the required surface wall attraction force is ensured as a whole, the moving body is held with reliability on the wall surface.

Therefore, the moving body can held with reliability on the wall surface and moved on the wall surface, while the interference between the permanent magnet and the obstacle is being avoided with reliability.

In addition, by control such that the sum total of the wall surface attraction forces of the permanent magnets becomes the required wall surface attraction force, an excessive increase in the wall surface attraction force due to interference avoidance can also be avoided. Therefore, for example, even in the case where the moving body rides across an obstacle such as level difference or a projection, the load associated with movement is reduced and there is also an effect that the moving function is enhanced.

BRIEF DESCRIPTION OF THE DRAWINGS

FIG. 6 is a schematic view for describing the advantages of the wall surface attraction type moving apparatus and the magnet drive method for a wall surface attraction type moving apparatus as one embodiment of the present invention;

BEST MODE FOR CARRYING OUT THE INVENTION

An embodiment of the present invention will hereinafter be described by the drawings.

FIGS. 1 through 6 show a wall surface attraction type moving apparatus and a magnet drive method for a wall surface attraction type moving apparatus as one embodiment of the present invention.

Figure 1:
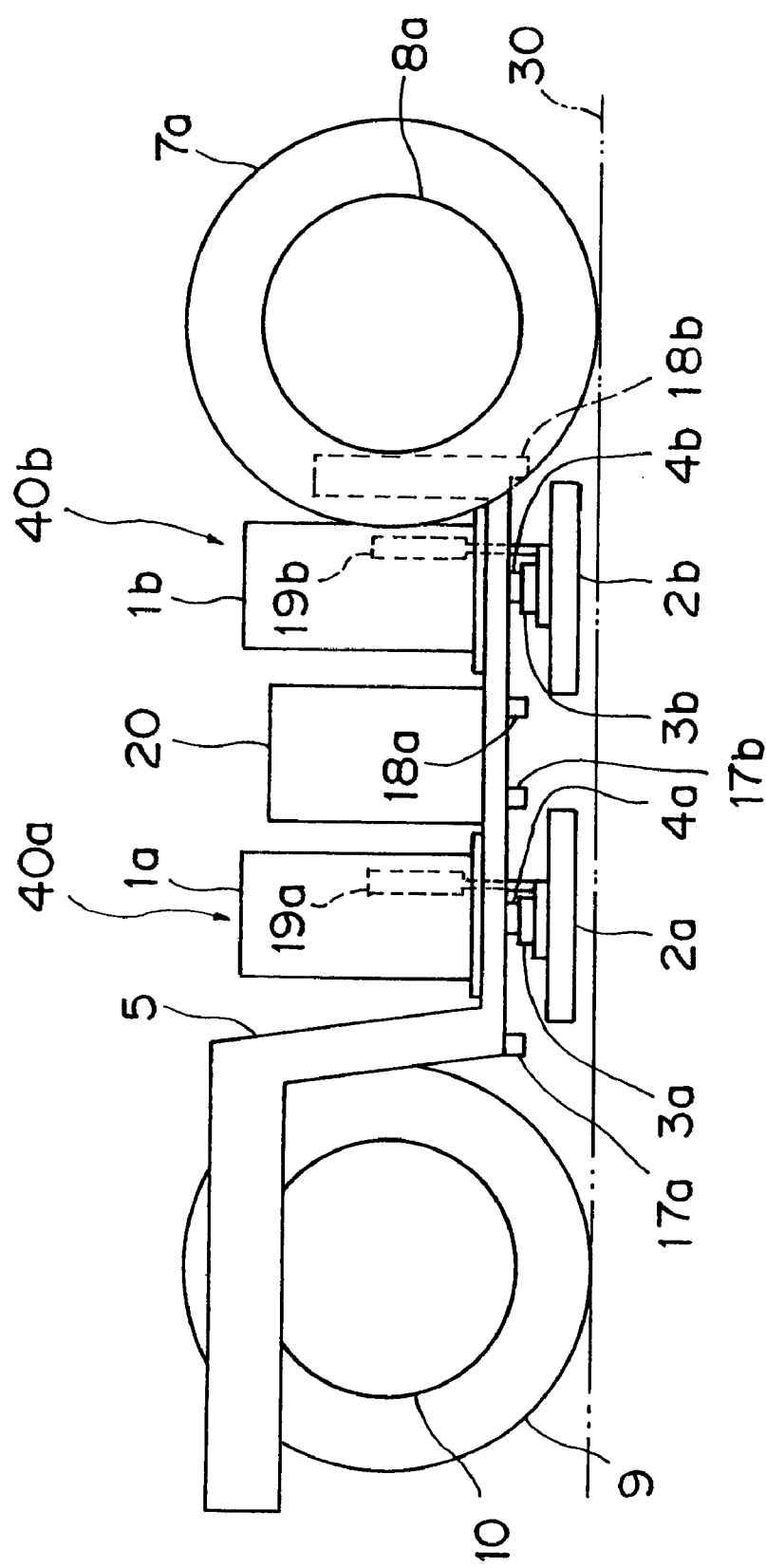
FIG. 1 is a side view showing a wall surface attraction type moving apparatus as one embodiment of the present invention.
Figure 2:
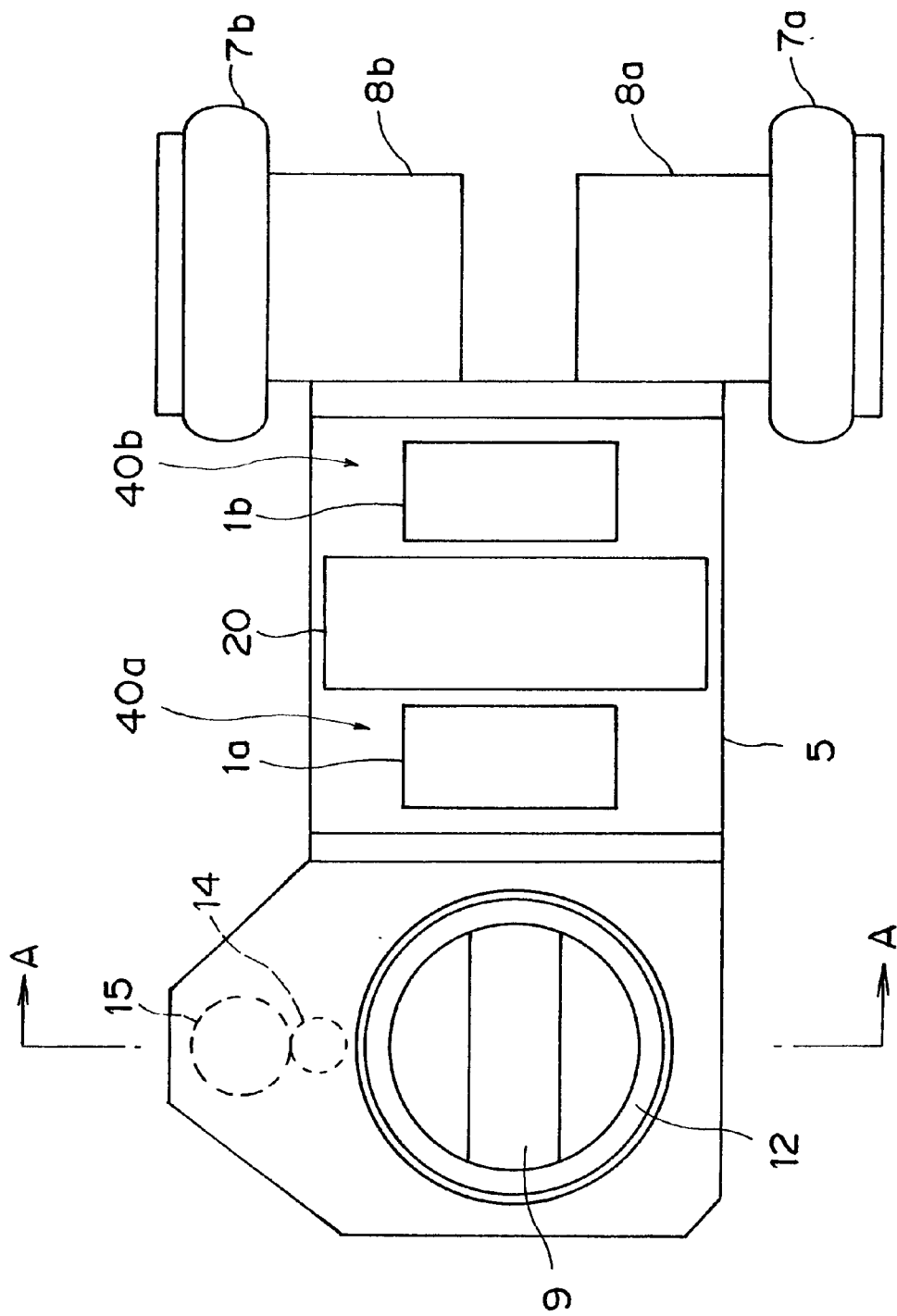
FIG. 2 is a plan view showing the wall surface attraction type moving apparatus as one embodiment of the present invention.
Figure 3:
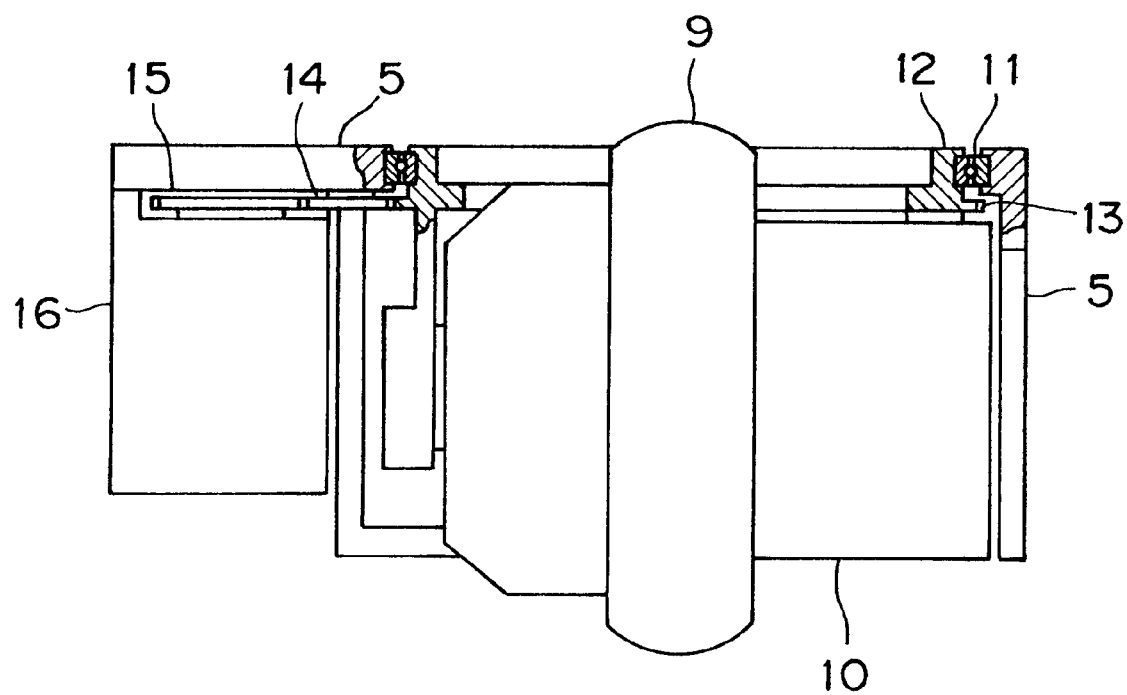
FIG. 3 is a front view showing the wall surface attraction type moving apparatus as one embodiment of the present invention.
Figure 4:
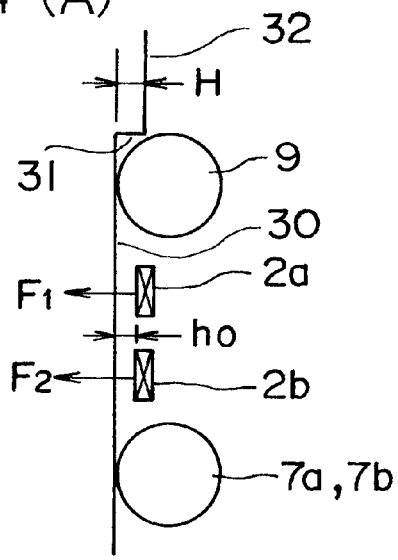
FIGS. 4(A) trough 4(E) are all diagrams for describing the wall surface attraction type moving apparatus and a magnet drive method for a wall surface attraction type moving apparatus as one embodiment of the present invention and are schematic views showing operation while riding across an obstacle (level difference), the operation having been shown in order of FIGS. 4(A) through 4(E)
Figure 4:
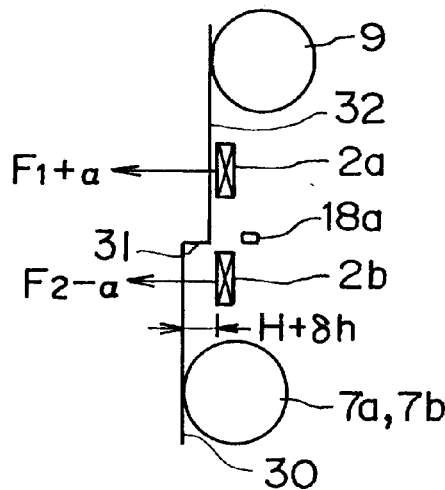
Figure 4:
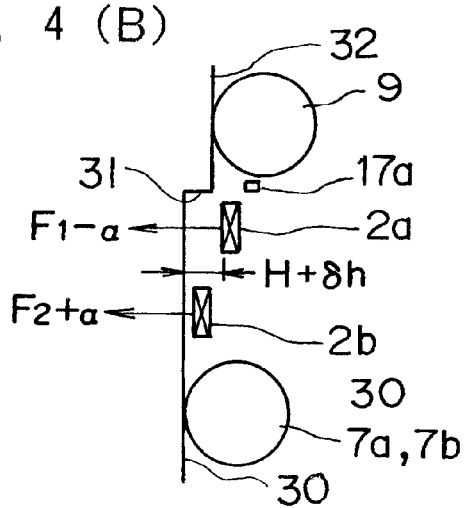
Figure 4:
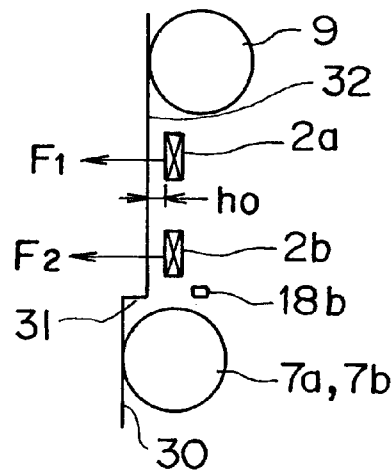
Figure 4:
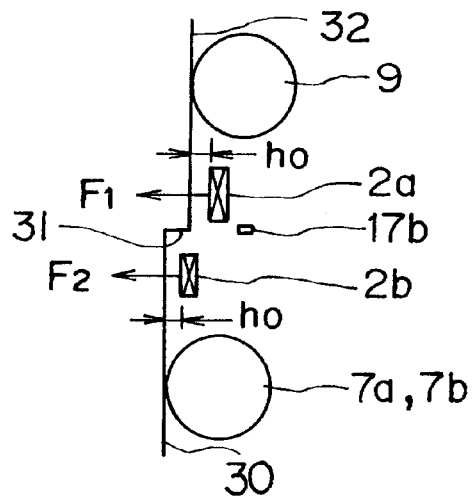
Figure 5:
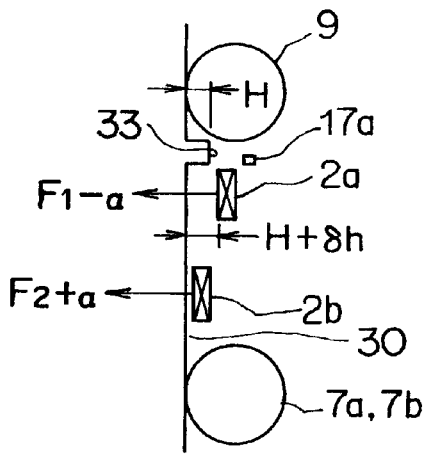
FIGS. 5(A) trough 5(E) are all diagrams for describing the wall surface attraction type moving apparatus and the magnet drive method for a wall surface attraction type moving apparatus as one embodiment of the present invention and are schematic views showing operation while riding across an obstacle (projection), the operation having been shown in order of FIGS. 5(A) through 5(E)
Figure 5:
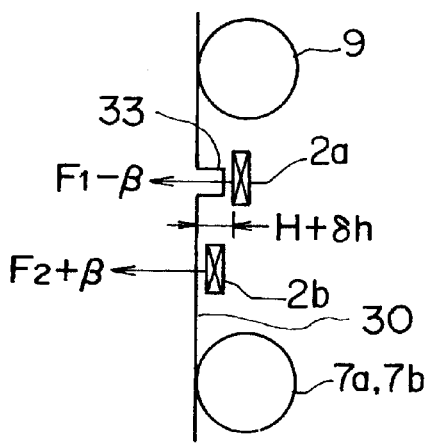
Figure 5:
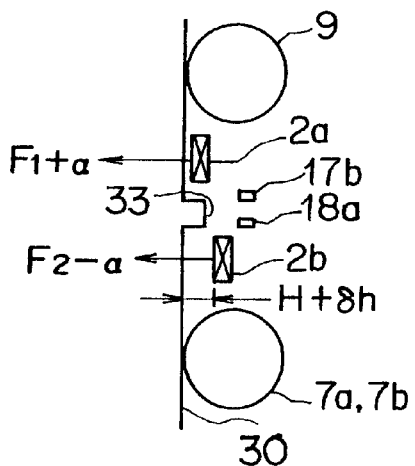
Figure 5:
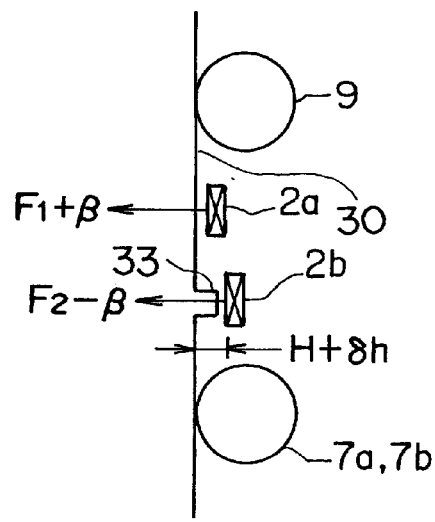
Figure 5:
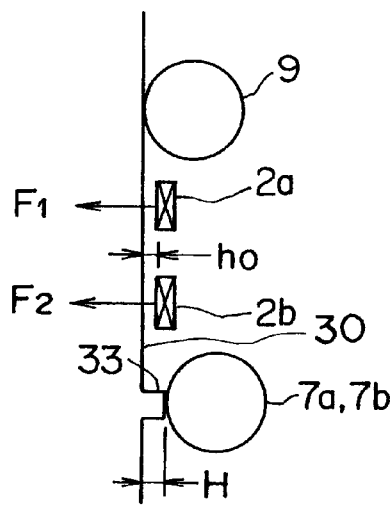
Figure 7:
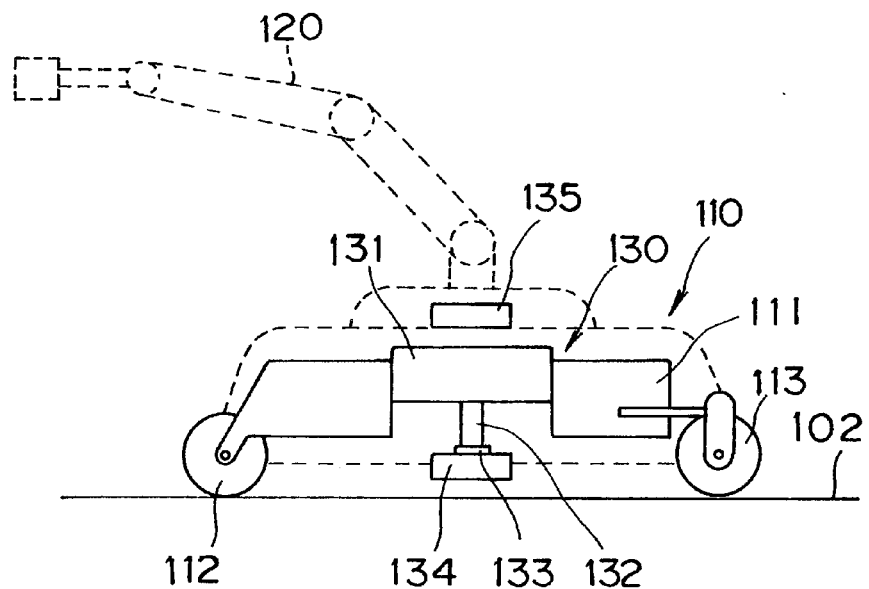
FIG. 7 is a schematic side view showing a conventional wall surface attraction type moving apparatus.
Figure 8:
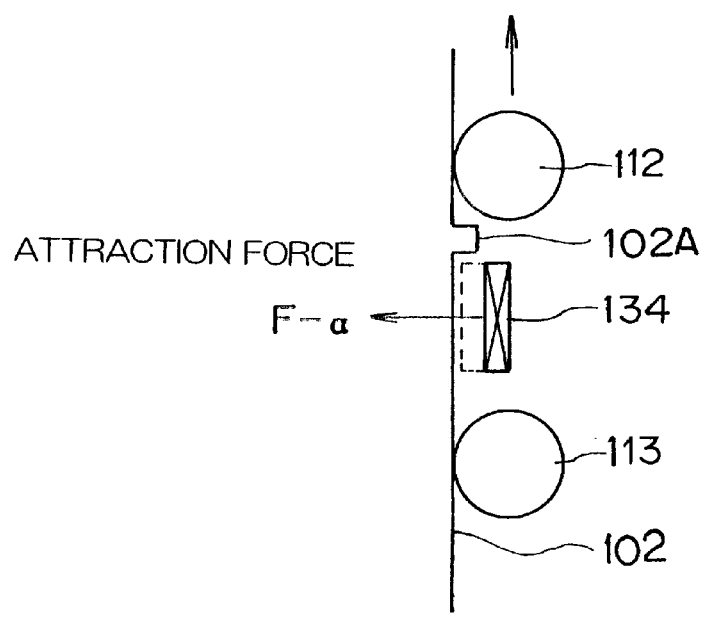
FIG. 8 is a schematic view for describing problems associated with the conventional wall surface attraction type moving apparatus.
Figure 9:
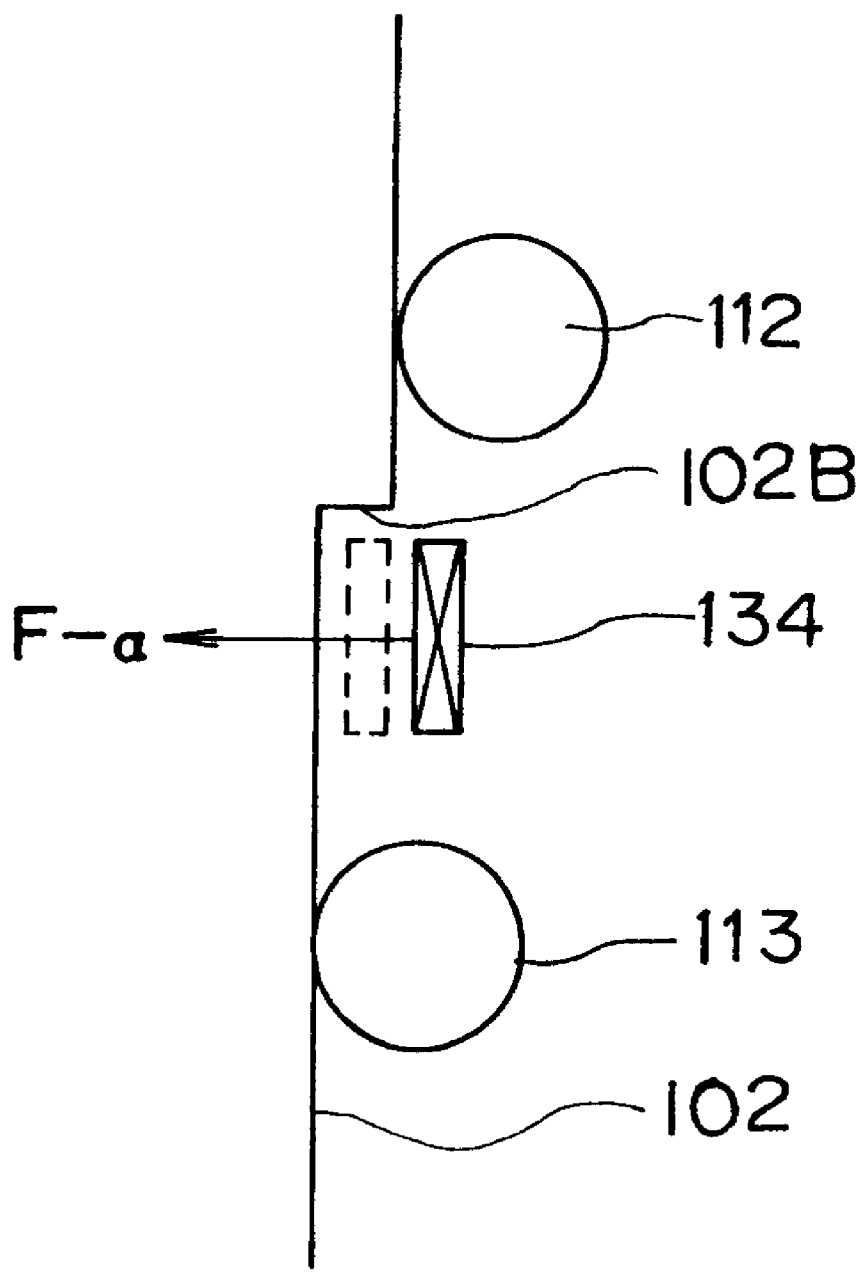
FIG. 9 is a schematic view for describing problems associated with the conventional wall surface attraction type moving apparatus.

As shown in FIGS. 1 through 3, the wall surface attraction type moving apparatus of the present invention is provided with a moving body (main body) 5 travelable along the surface (travel surface 30) of a structure, a pair of rear wheels 7a and 7b installed through drive mechanisms 8a and 8b respectively on the rear portion of the main body 5, and a front wheel 9 installed through a drive mechanism 10 on the front portion of this main body 5. The main body 5 is equipped with a manipulator (not shown), etc. The rear wheels 7a and 7b and front wheel 9 are rotatably supported by the drive mechanisms 8a, 8b, and 10, respectively. The rear wheels 7a and 7b and front wheel 9 are also driven to rotate by motors (not shown) incorporated in the drive mechanisms 8a, 8b, and 10, respectively, whereby the main body 5 is movable.

Among them, the drive mechanism 10 rotatably supporting the front wheel 9, as shown in FIGS. 2 and 3, is fixed to a steering shaft 12, which is in turn supported on the main body 5 through a bearing 11. Also, the outer circumference of the steering shaft 12, as shown in FIG. 3, is provided with a gear 13, which in turn meshes with a gear 15 through an idle gear 14 supported on the side of the main body 5 so that it is free to rotate. The gear 15 is driven to rotate by a motor (not shown) incorporated in a steering drive mechanism 16. Therefore, with the drive mechanism 16, the steering shaft 12 is drive to rotate through the gears 15, 14, and 13, whereby the front wheel 9 is steered.

And, as shown in FIG. 1, the main body 5 is further provided with a plurality (here, two) of attraction mechanisms 40a and 40b. The attraction mechanisms 40a and 40b are provided with magnet drive mechanisms 1a and 1b installed in the main body 5 and magnets (permanent magnets) 2a and 2b installed downward on the lower end portions of the shafts 4a and 4b of these magnet drive mechanisms 1a and 1b, respectively.

The shaft center lines of the shafts 4a and 4b of the magnet drive mechanisms 1a and 1b are both set in a direction perpendicular to the travel surface (magnetic wall surface) 30. The attraction mechanisms 40a and 40b drive the shafts 4a and 4b of such magnet drive mechanisms 1a and 1b to advance or retreat in the direction perpendicular to the travel surface 30, thereby adjusting the magnets 2a and 2b so that they advance or retreat in a direction which leaves or approaches the travel surface 30.

Incidentally, the attraction mechanisms 40a and 40b are arranged on the front portion (near the front wheel 9) of the main body and on the rear portion (near the rear wheels 7a and 7b) of the main body, respectively. Therefore, the magnets 2a and 2b provided in the attraction mechanisms 40a and 40b are arranged so that their positions are offset longitudinally in the moving direction of the main body (moving body) 5.

In addition, the attraction mechanisms 40a and 40b are further provided with position sensors 19a and 19b for respectively detecting the leaving/approaching direction positions of the magnets 2a and 2b against the travel surface 30, attraction force sensors (force sensors) 3a and 3b for respectively detecting the attraction forces of the magnets 2a and 2b to the travel surface 30, and obstacle sensors 17a, 17b, 18a, and 18b for detecting the approach of an obstacle such as level difference or a protrusion present on the travel surface 30 to the magnets 2a and 2b.

Among the sensors, the position sensors 19a and 19b are constituted by stroke sensors which detect the advancement/ retreat strokes of the magnets 2a and 2b.

Also, the force sensors 3a and 3b consist, for example, of discs provided with a strain gauge. The force sensors 3a and 3b are interposed between the point end portion of the shaft 4a and the magnet 2a and between the point end portion of the shaft 4b and the magnet 2b. The force sensors 3a and 3b detect the attraction forces (wall surface attraction forces) of the magnets 2a and 2b, by detecting strains corresponding to forces with which the magnets 2a and 2b attempt to move away from the shafts 4a and 4b as magnetic forces (attraction forces) arising from the magnets 2a and 2b become great, conversely speaking, by detecting strains corresponding to tension forces which are reduced between the magnet 2a and the shaft 4a and between the magnet 2b and the shaft 4b as magnetic forces (attraction forces) arising from the magnets 2a and 2b become small. Therefore, for example in the case where strains corresponding to forces with which the magnets 2a and 2b attempt to move away from the shafts 4a and 4b are measured, if the strain is great, attraction force (wall surface attraction force) will also be greater.

Also, the obstacle sensors 17a, 17b, 18a, and 18b can be classified into front obstacle sensors 17a and 18a arranged directly before the magnets 2a and 2b and rear obstacle sensors 17b and 18b arranged directly after the magnets 2a and 2b. And the obstacle sensors 17a, 17b, 18a, and 18b are all constituted by distance sensors for detecting a distance to a material body (object) which is present in a direction of detection. The detection directions of the sensors 17a, 17b, 18a, and 18b are set so as to go onto the travel surface 30 under the main body 5 (usually, in a direction perpendicular to the travel surface 3). Note that the rear obstacle sensor 17b associated with the front magnet 2a and the front obstacle sensor 18a associated with the rear magnet 2b are located at approximately the center of the main body 5 in the longitudinal direction.

Therefore, in the case where the distance to an object detected with the obstacle sensors 17a, 17b, 18a, and 18b is a magnitude equivalent to the distance to the travel surface 30, it can be judged that there is no such obstacle as level difference or a projection on the travel surface 30. Also, in the case where the distance to an object detected is smaller than a magnitude equivalent to the distance to the travel surface 30, it can be judged that there is an obstacle, such as up or down level difference or a projection, on the travel surface 30. In addition, in the case where the distance to an object detected is greater than a magnitude equivalent to the distance to the travel surface 30, it can be judged that there is up or down level difference, a groove, or the like on the travel surface 30.

Such detection results by the position sensors 19a and 19b, force sensors 3a and 3b, and obstacle sensors 17a, 17b, 18a, and 18b are transmitted to a controller (transmitter) 20. Based on the detection information by these position sensors 19a and 19b, force sensors 3a and 3b, and obstacle sensors 17a, 17b, 18a, and 18b, the controller 20 controls the magnet drive mechanisms 1a and 1b of the attraction mechanisms 40a and 40b individually.

Now, a description will be made of the control contents that are performed by the controller 20 which is the characteristic part of the wall surface attraction type moving apparatus of the present invention.

In this controller 20, advancement or retreat adjustment of the magnets 2a and 2b are performed through the magnet drive mechanisms 1a and 1b of the attraction mechanisms 40a and 40b in a direction which leaves or approaches the travel surface 30 so that the sum total of the attraction forces (wall surface attraction forces) in the attraction mechanisms 40a and 40b, detected with the force sensors 3a and 3b, becomes the required wall surface attraction force at all times.

Note that the required wall surface attraction force is attraction force by magnetic force produced between the travel surface 30 which is a magnetic wall surface and the magnets 2a and 2b, and is set as a force of the magnitude which can reliably hold the wall surface attraction type moving apparatus of the present invention onto the travel surface 30.

Also, in the controller 20, if any of the obstacle sensors 17a, 17b, 18a, and 18b detects the presence of an obstacle such as level difference or a projection, on the basis of the distance to the obstacle detected with the obstacle sensor detecting the presence of this obstacle and position information from the position sensor 19a or 19b of the magnet 2a or 2b directly after the obstacle sensor detecting this obstacle, retreat adjustment of the magnet 2a or 2b will be performed through the magnet drive mechanism 1a or 1b in a direction which leaves the travel surface 30 so that the magnet 2a or 2b is not be interfered with by this obstacle.

In addition, at the same time as this retreat adjustment, in the controller 20, since the wall surface attraction force of the magnet 2a or 2b subjected to the retreat adjustment is reduced, advancement adjustment of the other magnet, i.e., advancement adjustment of the magnet 2a or 2b not being interfered with by the obstacle is performed through the magnet drive mechanism 1a or 1b in a direction which approaches the travel surface 30, whereby the sum total of attraction forces (wall surface attraction forces) in the attraction mechanisms 40a and 40b is controlled so as to become the required wall surface attraction force at all times.

The wall surface attraction type moving apparatus as one embodiment of the present invention is constituted as described above. Therefore, by the wall surface attraction forces which are exhibited through the attraction mechanisms 40a and 40b, even if the surface of a structure on which the apparatus travels is not vertically present downward, i.e., for example even against a vertical surface, the movement of the apparatus can be performed.

And if a description will be made of the operation of the apparatus of the present invention (a magnet drive method for the wall surface attraction type moving apparatus according to this embodiment), in the case where the apparatus of the present invention rides across an obstacle such as level difference or a projection, it will operate as follows:

For instance, when the apparatus of the present invention moves (travels) on the travel surface (vertical surface) 30 oriented in a vertical direction, in the case where it rides across level difference (up level difference) 31 present on the travel surface 30, as shown in FIGS. 4(A) through 4(E), the positions of the magnets 2a and 2b are adjusted by the controller 20.

In other words, first, as shown in FIG. 4(A), until the apparatus arrives near the level difference 31, the controller 20 adjusts the positions of the magnets 2a and 2b through the magnet drive mechanisms 1a and 1b of the attraction mechanisms 40a and 40b so that the magnets 2a and 2b are located at a nearly equal distance $h_o$ away from the flat travel surface 30, thereby controlling the sum total FS $(=F_1+F_2)$ of the attraction forces $F_1$ and $F_2$ of the attraction mechanisms 40a and 40b so that it becomes the required wall surface attraction force F.

And if the apparatus arrives near the level difference 31, the front wheel will first ride across this level difference 31. With advancement of the apparatus, if the front magnet 2a approaches this level difference 31, as shown in FIG. 4(B), the front obstacle sensor 17a arranged directly before the front magnet 2a will respond to this level difference 31.

In other words, since the distance to the side of the travel surface 30 detected with the front obstacle sensor 17a becomes shorter than theretofore, the controller 20 can judge that there is something (obstacle) at a closer distance than the travel surface 30.

At the same time as this judgment, the controller 20 computes the height H of the obstacle (here, the level difference 31) from the distance to the obstacle detected with this front obstacle sensor 17a, and also compares the current position of the magnet 2a (distance $h_o$ with the travel surface 30) detected by the position sensor 19a with the distance (=H+δh) of excess clearance length δh added to the height H of this obstacle (level difference 31). This distance (=H+δh) is equivalent to an appropriate distance from the travel surface (wall surface) 30 of the magnet on this side of the obstacle.

And if the current position of the magnet 2a (distance $h_o$ with the travel surface 30) is shorter than the appropriate distance (H+δh), the controller 20 will perform retreat adjustment of the front magnet 2a through the magnet drive mechanism 1a so that the position of the magnet 2a is away from the travel surface 30 by the appropriate distance (H+δh).

With this retreat adjustment of magnet 2a, the attraction force of the attraction mechanism 40a is reduced. Therefore, the controller 20, along with this retreat adjustment of magnet 2a, performs advancement adjustment of the magnet 2b by this amount of reduction α in the attraction force of the attraction mechanism 40a, thereby increasing the attraction force of the attraction mechanism 40b. With this, the attraction force of the attraction mechanism 40a becomes from $F_1$ to $(F_1-\alpha)$, and the attraction force of the attraction mechanism 40b becomes from $F_2$ to $(F_2+\alpha)$. Therefore, the total attraction force FS of both attraction mechanisms 40a and 40b still holds a constant value (required wall surface attraction force $F=F_1+F_2$) like the following equation.

$$FS=(F_1-\alpha)+(F_2+\alpha)=F_1+F_2$$

And if the apparatus advances further, then the front magnet 2a rides across this level difference 31 and arrives onto a travel surface 32 on the high step side, and then the front magnet 2a comes to generate magnetic force (attraction force) between it and the travel surface 32 on the high step side, the attraction force at the front magnet 2a will be great. Therefore, as shown in FIG. 4(C), the controller 20 adjusts the positions of the magnets 2a and 2b through the magnet drive mechanisms 1a and 1b of the attraction mechanisms 40a and 40b so that the magnets 2a and 2b are again located at a nearly equal distance $h_o$ away from the travel surfaces 30 and 32. With this adjustment, if the attraction forces of the attraction mechanisms 40a and 40b are taken to be $F_1$ and $F_2$, the sum total FS $(=F_1+F_2)$ of these attraction forces $F_1$ and $F_2$ are controlled so as to become the required wall surface attraction force F.

And if the apparatus advances further and the rear magnet 2b approaches this level difference 31, as shown in FIG. 4(D), the front obstacle sensor 18a arranged directly before the rear magnet 2b will respond to this level difference 31.

In other words, since the distance to the side of the travel surface 30 detected with the front obstacle sensor 18a becomes shorter than theretofore, the controller 20 can judge that the rear magnet 2b has approached the level difference 31.

At the same time as this judgment, the controller 20 computes the height H of the obstacle (here, the level difference 31) from the distance to the obstacle detected with this rear obstacle sensor 18a, and also compares the current position of the magnet 2b (distance $h_o$ with the travel surface 30) detected by the position sensor 19b with the appropriate distance (=H+δh) of excess clearance length δh added to the height H of this level difference 31. If the current position of the magnet 2b (distance $h_o$ with the travel surface 30) is shorter than the appropriate distance (H+δh), the controller 20 will perform retreat adjustment of the rear magnet 2b through the magnet drive mechanism 1b so that the position of the magnet 2b is away from the travel surface 30 by the appropriate distance (H+δh).

With this retreat adjustment of magnet 2b, the attraction force of the attraction mechanism 40b is reduced. Therefore, the controller 20, along with this retreat adjustment of magnet 2b, performs advancement adjustment of the magnet 2a, thereby increasing the attraction force of the attraction mechanism 40b by this amount of reduction α in the attraction force of the attraction mechanism 40a. With this, the attraction force of the attraction mechanism 40a becomes from $F_1$ to $(F_1+\alpha)$, and the attraction force of the attraction mechanism 40b becomes from $F_2$ to $(F_2-\alpha)$. Therefore, the total attraction force FS of both attraction mechanisms 40a and 40b still holds a constant value (required wall surface attraction force $F=F_1+F_2$) like the following equation.

$$FS=(F_1+\alpha)+(F_2-\alpha)=F_1+F_2$$

And if the apparatus advances further, then the rear magnet 2b rides across this level difference 31 and arrives onto the travel surface 32 on the high step side, and then the rear magnet 2b comes to generate magnetic force (attraction force) between it and the travel surface 32 on the high step side, the attraction force at the rear magnet 2b will be great. Therefore, as shown in FIG. 4(E), the controller 20 adjusts the positions of the magnets 2a and 2b through the magnet drive mechanisms 1a and 1b of the attraction mechanisms 40a and 40b so that the magnets 2a and 2b are again located at a nearly equal distance $h_o$ away from the travel surfaces 30 and 32. With this adjustment, if the attraction forces of the attraction mechanisms 40a and 40b are taken to be $F_1$ and $F_2$, the sum total FS $(=F_1+F_2)$ of these attraction forces $F_1$ and $F_2$ are controlled so as to become the required wall surface attraction force F.

In this manner, if the sum total FS of the attraction forces of the attraction mechanisms 40a and 40b is controlled so as to become the required wall surface attraction force F $(=F_1+F_2)$ at all times, the apparatus can ride across the level difference 31 without incurring the interference between the magnets 2a and 2b and the level difference, while being brought into contact with the travel surfaces 30 to 32 with reliability. This makes a contribution to an enhancement in the mobility of the wall surface attraction type moving apparatus.

Also, in the case where the apparatus rides across down level difference present on the travel surface 30, although not shown, the distance to the side of the travel surface 30 detected by the front obstacle sensors 17a and 18b becomes longer than heretofore, so the controller 20 can judge that the magnet 2a and 2b have approached the down level difference. Even in this case, as with the case of the above-mentioned up level difference, if the sum total FS of the attraction forces of the attraction mechanisms 40a and 40b is controlled so as to become the required wall surface attraction force F ($=F_1+F_2$) at all times, the apparatus can ride across the down level difference without incurring the interference between the magnets 2a and 2b and the level difference, while being brought into contact with the travel surfaces 30 to 32 with reliability.

On the other hand, for example when the apparatus of the present invention moves (travels) on the travel surface (vertical surface) 30 oriented in a vertical direction, in the case where it rides across a projection 33 present on the travel surface 30, as shown in FIGS. 5(A) through 5(E), the positions of the magnets 2a and 2b are adjusted by the controller 20.

In other words, the apparatus arrives near the projection 33, the front wheel rides across the projection 33, and if the front magnet 2a approaches this projection 33, as shown in FIG. 5(A), the front obstacle sensor 17a arranged directly before the front magnet 2a will first respond to this level difference 33.

In other words, since the distance to the side of the travel surface 30 detected with the front obstacle sensor 17a becomes shorter than theretofore, the controller 20 can judge that there is something (obstacle) at a closer distance than the travel surface 30.

At the same time as this judgment, the controller 20 computes the height H of the obstacle (here, the projection 33) from the distance to the obstacle detected with this front obstacle sensor 17a, and also compares the current position of the magnet 2a (distance $h_o$ with the travel surface 30) detected by the position sensor 19a with the appropriate distance (=H+δh) of excess clearance length δh added to the height H of this obstacle (projection 33).

And if the current position of the magnet 2a (distance $h_o$ with the travel surface 30) is shorter than the appropriate distance (H+δh), the controller 20 will perform retreat adjustment of the front magnet 2a through the magnet drive mechanism 1a so that the position of the magnet 2a is away from the travel surface 30 by the appropriate distance (H+δh).

With this retreat adjustment of magnet 2a, the attraction force of the attraction mechanism 40a is reduced. Therefore, the controller 20, along with this retreat adjustment of magnet 2a, performs advancement adjustment of the magnet 2b, thereby increasing the attraction force of the attraction mechanism 40b by this amount of reduction α in the attraction force of the attraction mechanism 40a. With this, the attraction force of the attraction mechanism 40a becomes from $F_1$ to ($F_1-α$), and the attraction force of the attraction mechanism 40b becomes from $F_2$ to ($F_2+α$). Therefore, the total attraction force FS of both attraction mechanisms 40a and 40b still holds a constant value (required wall surface attraction force $F=F_1+F_2$) like the following equation.

$$FS=(F_1-α)+(F_2+α)=F_1+F_2$$

And the apparatus advances further, and as shown in FIG. 5(B), if the front magnet 2a is located above this projection 33 and comes to generate magnetic force (attraction force) between it and this projection 33, this time the attraction force at the front magnet 2a will be great, but, in the case where the area of the projection 33 is small, sufficient attraction force (e.g., $F_1$) will not be obtained even if the magnet 2a is close to the projection 33. For example, if the attraction force which is insufficient is taken to be β, all attraction force that is obtained is only ($F_1-β$).

Hence, in order to supplement this insufficiency by the rear attraction mechanism 40b, the controller 20 performs advancement adjustment of the magnet 2b, thereby increasing the attraction force of the attraction mechanism 40b by this amount of reduction β in the attraction force of the attraction mechanism 40a. With this, the attraction force of the attraction mechanism 40a becomes ($F_1-β$), while the attraction force of the attraction mechanism 40b becomes ($F_2+β$). Therefore, the total attraction force FS of both attraction mechanisms 40a and 40b still holds a constant value (required wall surface attraction force $F=F_1+F_2$) like the following equation.

$$FS=(F_1-β)+(F_2+β)=F_1+F_2$$

And if the apparatus advances further and the rear magnet 2b approaches this projection 33, as shown in FIG. 5(C), the front obstacle sensor 18a arranged directly before the rear magnet 2b will respond to this projection 33.

In other words, since the distance to the side of the travel surface 30 detected with the front obstacle sensor 18a becomes shorter than theretofore, the controller 20 can judge that the rear magnet 2b has approached the projection 33.

At the same time as this judgment, the controller 20 computes the height H of the obstacle (here, the projection 33) from the distance to the obstacle detected with this rear obstacle sensor 18a, and also compares the current position of the magnet 2b (distance $h_o$ with the travel surface 30) detected by the position sensor 19b with the appropriate distance (=H+δh) of excess clearance length δh added to the height H of this projection 33. If the current position of the magnet 2b (distance $h_o$ with the travel surface 30) is shorter than the appropriate distance (H+δh), the controller 20 will perform retreat adjustment of the front magnet 2b through the magnet drive mechanism 1b so that the position of the magnet 2b is away from the travel surface 30 by the appropriate distance (H+δh).

With this retreat adjustment of magnet 2b, the attraction force of the attraction mechanism 40b is reduced. Therefore, the controller 20, along with this retreat adjustment of magnet 2b, performs advancement adjustment of the magnet 2a, thereby increasing the attraction force of the attraction mechanism 40a by this amount of reduction α in the attraction force of the attraction mechanism 40b. With this, the attraction force of the attraction mechanism 40a becomes from $F_1$ to ($F_1+α$), and the attraction force of the attraction mechanism 40b becomes from $F_2$ to ($F_2-α$). Therefore, the total attraction force FS of both attraction mechanisms 40a and 40b still holds a constant value (required wall surface attraction force $F=F_1+F_2$) like the following equation.

$$FS=(F_1+α)+(F_2-α)=F_1+F_2$$

And the apparatus advances further, and as shown in FIG. 5(D), if the rear magnet 2b is located above this projection 33 and comes to generate magnetic force (attraction force) between it and this projection 33, the attraction force at the rear magnet 2b will be great, but, in the case where the area of the projection 33 is small, sufficient attraction force (e.g., $F_2$) will not be obtained even if the magnet 2b is close to the projection 33. For example, if the attraction force which is insufficient is taken to be $\beta$, all attraction force that is obtained is only $(F_2-\beta)$.

Hence, in order to supplement this insufficiency by the front attraction mechanism 40a, the controller 20 performs advancement adjustment of the magnet 2a, thereby increasing the attraction force of the attraction mechanism 40a by this amount of reduction $\beta$ in the attraction force of the attraction mechanism 40b. With this, the attraction force of the attraction mechanism 40b becomes $(F_2-\beta)$, while the attraction force of the attraction mechanism 40a becomes $(F_1+\beta)$. Therefore, the total attraction force FS of both attraction mechanisms 40a and 40b still holds a constant value (required wall surface attraction force $F=F_1+F_2$) like the following equation.

$$FS=(F_1+\beta)+(F_2-\beta)=F_1+F_2$$

If the rear magnet 2b rides across this projection 33, it will generate magnetic force (attraction force) between it and the travel surface 32 and the attraction force at the rear magnet 2b will be great. Therefore, as shown in FIG. 5(E), the controller 20 adjusts the positions of the magnets 2a and 2b through the magnet drive mechanisms 1a and 1b of the attraction mechanisms 40a and 40b so that the magnets 2a and 2b are again located at a nearly equal distance $h_o$ away from the travel surface 30. With this adjustment, the sum total FS of the attraction forces of the attraction mechanisms 40a and 40b are controlled so as to become the required wall surface attraction force $F (=F_1+F_2)$.

In this manner, if the sum total FS of the attraction forces of the attraction mechanisms 40a and 40b is controlled so as to become the required wall surface attraction force F $(=F_1+F_2)$ at all times, the apparatus can ride across the projection 33 without incurring the interference between the magnets 2a and 2b and the projection 33, while being brought into contact with the travel surface 30 with reliability. This makes a contribution to an enhancement in the mobility of the wall surface attraction type moving apparatus.

Also, in the case where the apparatus rides across a downward groove present in the travel surface 30, although not shown, the distance to the side of the travel surface 30 detected by the front obstacle sensors 17a and 18a becomes longer than heretofore, so the controller 20 can judge that the magnet 2a and 2b have approached the groove. Even in this case, as with the case of the above-mentioned projection, if the sum total FS of the attraction forces of the attraction mechanisms 40a and 40b is controlled so as to become the required wall surface attraction force F $(=F_1+F_2)$ at all times, the apparatus can pass across a groove without producing excessive wall surface attraction force, while being brought into contact with the travel surface 30 with reliability.

In other words, if the attraction mechanism 40a or 40b is located above a groove, the attraction force $F_1$ or $F_2$ will be reduced. In connection with this, for example if the attraction mechanism 40a or 40b located above the groove is advanced downward to avoid a reduction in the attraction force $F_1$ or $F_2$, if only the other attraction mechanism 40b or 40a not located above the groove is advanced downward, or if the attraction mechanism 40a or 40b located above the groove and the other attraction mechanism 40b or 40a not located above the groove are both advanced downward, the sum total FS of the attraction forces can be made to always become the required wall surface attraction force F $(=F_1+F_2)$ which is not excessive.

Also, in the case where the wall surface attraction type moving apparatus of the present invention retreats, on the basis of detection information from the rear obstacle sensors 17b and 18b instead of the front obstacle sensors 17a and 18a, if the attraction mechanism 40a or 40b is controlled in a similar manner as the above-mentioned, the apparatus can ride across or pass across an obstacle without incurring the interference between the magnets 2a and 2b and the obstacle.

Incidentally, in such a manner, when the apparatus rides across an obstacle such as the level difference 31 or the projection 33, the sum total FS of the attraction forces of the attraction mechanisms 40a and 40b becomes the required wall surface attraction force F $(=F_1+F_2)$ at all times, so there is no possibility that the wall surface attraction force will be excessive, and in this respect, the present invention also makes a contribution to an enhancement in the mobility of the apparatus.

In other words, for example, as shown in FIG. 6, if the load applied to the wheel is taken to be W, the force (drive force) which pushes the wheel to be Q, the wheel diameter of the front wheel 9 or the rear wheels 7a and 7b to be D, the height of the level difference 31 to be s, the angle of the level difference 31 at which the wheel in contact with the level difference 31 attempts to ride across the level difference 31 to be $\theta$, and the horizontal distance between the contact center line of the wheel and the contact point with the level difference 31 to be L, it will be possible to ride across the level difference 31 if the following equation is met.

$$Q > W \cdot \tan\theta = W \cdot [2(s/L)/\{1-(s/L)^2\}] \approx W \cdot 2(s/L)$$

In the apparatus of the present invention, since the wall surface attraction force F does not become excessive, the load W in the above equation can be reduced, and if the load W becomes small, $\theta$ can be increased. Furthermore, in other words, since the height s of the level difference 31 cross which the apparatus can ride can be made high, the present invention makes a contribution to an enhancement in the mobility of the apparatus.

Note that the present invention is not to be limited to the above-mentioned embodiments, but various modifications can be carried out without departing from the gist of the invention.

For instance, while the embodiment of the present invention has been provided with two sets of front and rear attraction mechanisms, the invention is not limited to the two sets, but three or more sets of attraction mechanisms may be installed. Even in this case, any one of the attraction mechanisms is installed in front of or in the rear of the other attraction mechanism, and the permanent magnets of the attraction mechanisms are arranged so that the positions thereof are offset longitudinally in the moving direction of the above-mentioned moving body. With this arrangement, even if any of the permanent magnets retreats to avoid interference between it and an obstacle such as level difference or a projection, among the other permanent magnets there will always be a permanent magnet which is not interfered with by the obstacle such as level difference or a projection. If advancement adjustment of this permanent magnet is performed, it will be possible to control the total attraction force so that it becomes the required wall surface attraction force F at all times, and therefore effects such as the aforementioned can be obtained with reliability.

Also, in the embodiment of the present invention, although the advancement/retreat position control of the magnets (permanent magnets) has been performed based on detection information from three kinds of sensors, a position sensor, an attraction force sensor (force sensor), and an obstacle sensor, it is also considered that among these three kinds of sensors, some are equipped to perform the advancement/retreat position control of the magnets (permanent magnets).

In other words, since the attraction force detected with the attraction force sensor corresponds to the distance between the magnet and the magnetic wall surface (including an obstacle), it is also possible to compute the distance between the magnet and the magnetic wall surface (including an obstacle) from the detection information of this attraction force sensor. That is, it is also possible to use the attraction force sensor as a position sensor.

In addition, when the moving apparatus of the present invention rides across an obstacle on a wall surface such as level difference or a projection, the detection information of the attraction force sensor changes suddenly, so it is also possible to detect that there is present an obstacle, such as level difference or a projection, which has a possibility of interfering with the permanent magnet. That is, it is also possible to use the attraction force sensor as an obstacle sensor.

Therefore, it is considered that performing the advancement/retreat position control of the permanent magnet on the basis of only the detection information of the attraction sensor is also possible. Of course, the attraction force sensor can predict the presence of an obstacle, but it is difficult to previously detect with reliability the distance between the permanent magnet and an obstacle before the permanent magnet is interfered with by the obstacle, as does the obstacle sensor. Therefore, position control of the permanent magnet which is good in precision, such as that in the embodiment of the present invention, is difficult. For more proper control, it is preferable to provide a position sensor and an obstacle sensor as well as an attraction force sensor and perform the position control of a permanent magnet on the basis of each detection information of these sensors.

INDUSTRIAL APPLICABILITY

Even if an obstacle, etc., are present on a wall surface (travel surface), the wall surface attraction type moving apparatus of the present invention can travel so that a permanent magnet is not interfered with by this obstacle, while the apparatus is always being brought into contact with the wall surface with reliability by the required wall surface attraction force F. Therefore, the present invention can enhance the mobility of the apparatus. Moreover, since the wall surface attraction force F does not become excessive, the apparatus can be made so as to ride across higher level difference. In this respect, the mobility of the apparatus can also be enhanced. Therefore, if the apparatus of the present invention is employed in the maintenance/inspection, etc. of a structure formed with a magnetic substance such as a large iron structure, the maintenance/inspection, etc., can be performed easily and quickly, and therefore the present invention is extremely useful.

We claim:

1. A wall surface attraction type moving apparatus comprising:

moving body which moves on a wall surface made of a magnetic substance;

wheels which are supported by said moving body and including a front wheel and a rear wheel;

a plurality of attraction mechanisms which are carried by the moving body; and a controller for controlling the attraction mechanism;

each of said attraction mechanisms including a permanent magnet carried by the moving body, and spaced from said wall surface, a drive mechanism for advancing the permanent magnet toward or retracting the permanent magnet away from the wall surface, and an attraction force sensor for detecting an attraction force of the permanent magnet acting on the wall surface;

said permanent magnets being longitudinally spaced from each other with respect to the running direction of said moving body;

said controller being operable to control the drive mechanisms in the attraction mechanisms to obtain an optimal wall surface attraction force which attracts the moving body toward the wall surface by the total sum of wall surface attraction forces of the permanent magnets in the attraction mechanisms in accordance with the detection information from said attraction force sensors.

2. The wall surface attraction type moving apparatus as set forth in claim 1, wherein said attraction mechanisms include said permanent magnet, said drive mechanism, said attraction force sensor, a position sensor for detecting a facewise position of the individual permanent magnet with respect to said wall surface, and an obstacle sensor for detecting an obstacle; appearing in or approaching the travelling path of the apparatus, and wherein said controller controls the drive mechanisms to obtain said optimal wall surface attraction force by the total sum of wall surface attraction forces of the permanent magnets of the drive mechanisms in accordance with the detection information from said position sensors, attraction force sensors, and obstacle sensors, and also controls the drive mechanisms to prevent the individual permanent magnet from bumping against the obstacle when the permanent magnet is likely to bump against the obstacle.

3. The wall surface attraction type moving apparatus as set forth in claim 2, wherein:

with respect to one of said plurality of attraction mechanisms having the permanent magnet which is likely to bump against the obstacle, said controller retracts the last-named permanent magnet away from the wall surface by the action of said drive mechanism to avoid the obstacle based on the detection information from said obstacle sensors, and at the same time, with respect to any other of said plurality of attraction mechanisms having the permanent magnet which is unlikely to bump against the obstacle, said controller advances the permanent magnet toward the wall surface by the action of said drive mechanism to increase the wall surface attraction force of the other permanent magnet to an optimal value to supplement such reduced attraction forces of the retracted permanent magnet.

4. The wall surface attraction type moving apparatus as set forth in claim 3, wherein said obstacle sensors detect the obstacle appearing in the travelling path of the apparatus by detecting a distance between said wall surface and the obstacle appearing on said wall surface under said moving body;

wherein said obstacle sensors include front obstacle sensors respectively disposed immediately ahead of said permanent magnets with respect to said moving direction of the moving body; and wherein if any of said plurality of front obstacle sensors has detected said obstacle, said controller advances the permanent magnet toward or retracts the permanent magnet away from said wall surface by the action of said drive mechanism based on the distance between the permanent magnet which corresponds to said front obstacle sensor and the obstacle with respect to the running direction of said moving body detected by the front obstacle sensor and based on said facewise position of the permanent magnet detected by said position sensor.

5. The wall surface attraction type moving apparatus as set forth in claim 4, wherein if any of said plurality of front obstacle sensors has detected the obstacle and when the permanent magnet which corresponds to said front obstacle sensor is likely to bump against the obstacle, said controller retracts the permanent magnet away from said wall surface by the action of said drive mechanism by an appropriate extent to avoid the obstacle.

6. The wall surface attraction type moving apparatus as set forth in claim 5, wherein the appropriate extent of retraction of said permanent magnet from said wall surface to prevent said permanent magnet from bumping against said obstacle is set so that said facewise position of the permanent magnet as a result of detection of said position sensor is greater by a predetermined distance than the distance between the permanent magnet which corresponds to said front obstacle sensor and the obstacle detected by said front obstacle sensor.

7. The wall surface attraction type moving apparatus as set forth in claim 4, wherein if any of said plurality of front obstacle sensors has detected the obstacle which is in the form a groove-shaped obstacle located away from the permanent magnet which corresponds to said front obstacle sensor, said controller obtains said optimal wall surface attraction force by advancing the permanent magnet toward said wall surface by the action of said drive mechanism.

8. The wall surface attraction type moving apparatus as set forth in claim 4, wherein said obstacle sensors detect the obstacle appearing on the wall surface by detecting a distance between said obstacle sensors and the obstacle appearing on said wall surface under said moving body, wherein said obstacle sensors include rear obstacle sensors respectively disposed immediately behind said permanent magnets with respect to said running direction of said moving body, and wherein if any of said plurality of rear obstacle sensors has detected the obstacle during the retreating of said moving body, said controller advances the permanent magnet toward or retracts the permanent magnet away from said wall surface by the action of said drive mechanism based on the distance between the rear obstacle sensor and the obstacle detected by the rear obstacle sensor and based on said facewise position of the permanent magnet which corresponds to said rear obstacle sensor detected by said position sensor.

9. A magnet drive method for a wall surface attraction type moving apparatus comprising:

a moving body which moves on a wall surface made of a magnetic substance;

wheels supported by said moving body and including a front wheel and a rear wheel; and a plurality of attraction mechanisms carried by the moving body each of the attraction mechanisms having a permanent magnet which is carried by the moving body and is spaced from the wall surface, a drive mechanism for advancing the permanent magnet toward or retracting the permanent magnet away from the wall surface, a position sensor for detecting a facewise position of the permanent magnet with respect to the wall surface, an attraction force sensor for detecting an attraction force of the permanent magnet acting on the wall surface, an obstacle sensor for detecting an obstacle appearing on the wall surface and approaching the permanent magnet, the permanent magnets being longitudinally spaced from each other with respect to the running direction of the moving body, said method comprising the following steps of:

if any of the obstacle sensors detects the obstacle appearing on the wall surface and approaches the permanent magnet, setting a prospective increased distance (H+δh) between the wall surface and one of the permanent magnets which approaches the obstacle base on a distance between the permanent magnet and the obstacle detected by the obstacle sensor;

controlling the drive mechanism of one of the permanent magnets which approaches the obstacle in accordance with the set prospective increased distance; and controlling the drive mechanism of the other permanent magnet to increase the wall surface attraction force of the other permanent magnet to an optimal value to supplement such reduced attraction force of the retracted permanent magnet.

* * * * *